UNITED STATES PATENT OFFICE.

JOHN L. KELLOGG AND BORIS KAZMANN, OF BATTLE CREEK, MICHIGAN, ASSIGNORS TO KELLOGG TOASTED CORN FLAKE CO., A CORPORATION OF MICHIGAN.

FOOD BEVERAGE AND THE PROCESS OF MAKING THE SAME.

1,349,000. Specification of Letters Patent. Patented Aug. 10, 1920.

No Drawing. Application filed March 31, 1917, Serial No. 158,962. Renewed June 27, 1919. Serial No. 307,250.

*To all whom it may concern:*

Be it known that we, JOHN L. KELLOGG and BORIS KAZMANN, citizens of the United States, residing at Battle Creek, county of Calhoun, and State of Michigan, have invented certain new and useful Improvements in Food Beverages and the Processes of Making the Same, of which the following is a specification.

In our companion case Serial No. 158961, filed concurrently herewith, we have described and claimed a food beverage and process of producing the same from cereals alone, without the necessary addition of saccharine matter, such process consisting, broadly stated, in rendering soluble or dextrinizing at least a part of the starch contents of the product by the application of heat and moisture preferably under pressure, and then roasting in granular form and extracting the soluble contents of the roasted material.

The principal object of the present invention is to facilitate and increase the dextrinization which occurs in our above mentioned basic process. We accomplish this object, according to the present invention, by adding malt, or any other suitable enzym of soluble ferment to the cereal dough and by then arresting the diastatic action before the same results in the production of maltose. By such arrested diastatic action, we produce a solubilization or dextrinization of part of the contents of the product.

In carrying out the present process, it is intended to secure the resulting beverage from starch-bearing material which is subjected to a dextrinizing action which is facilitated by the use of a diastase, such as malt; the diastatic action being however, arrested in the manner hereinafter described. In our companion case we specify that the desired result can be secured without the necessary addition of extraneous saccharine matter. Of course such matter can be added, but such addition is not necessary to obtain the desired result.

Among the starch-bearing materials which we propose to employ are, legumes, nuts, tubers, such as taro and arrowroot; starch-bearing roots, starch-bearing grains, fruits, such as figs, prunes and bananas; starch-bearing seeds such as St. John's bread and algaroba beans; fat-bearing beans, such as soja beans; grains, such as wheat, rye, barley, corn, Kafir corn, rice and cotton seed. We prefer however, to employ as the starch-bearing starting materials, rye, wheat grains and wheat bran.

As an additional starting material we use malt, or a water extract of malt, preferably in crushed or finely ground form.

With these starting materials the process preferably is carried out in a series of steps as are hereinafter enumerated, but it is to be clearly understood that these steps may be altered in their order and some of them may be omitted, and various other changes in the means and manner of securing the final result may be resorted to within the scope of what is claimed, and as indicated by the variations in the different claims, without departing from the spirit of the invention.

*Step 1—Cleansing.*—The selected starch-bearing materials are first thoroughly cleansed in any suitable manner.

*Step 2—Grinding.*—The starch-bearing materials are milled, ground or granulated in any desirable way and in any suitable apparatus.

*Step 3—Blending.*—The different starting materials, together with the malt, are suitably blended together according to the flavor desired. We prefer to use a blend composed of thirty parts of wheat flour, thirty parts of rye flour, thirty parts of bran flour, and ten parts of malt flour, but as before stated this blend may be changed from time to time to suit the taste and in some cases any one of the materials may be used alone as a starting material, instead of employing a blend.

*Step 4—Water-mixing.*—The selected flours are thoroughly mixed with water to produce suitable dough. We prefer to employ from thirty to sixty per cent. of water but other amounts may be used. We have found the ordinary baker's mixer to be suitable for producing the dough.

*Step 5—Loaving.*—The dough is preferably divided into loaves, either by hand or machine. We have found it convenient to employ loaves approximately twenty-four inches long, twelve inches wide and two inches thick.

*Step 6—Dextrinization.*—We prefer to dextrinize at least a part of the starch-contents of the mixture. The amount of dextrinization which we have found capable of producing a satisfactory beverage is that which results from subjecting the loaves to about fifteen pounds of steam pressure in a steam retort for a period of from two hours to two hours and fifty minutes, but the manner of producing the dextrinization and the pressure and time of application when steam is employed may be varied within the scope of the claims. The method of dextrinization which we have employed with satisfactory results is as follows:

We place the loaves flat upon large steel trays which are supported one above the other and spaced from each other just sufficiently to prevent one tray from touching the loaves of a lower tray. These trays are placed in large steam retorts which are then closed so that live steam pressure may be directly applied to the loaves. As above stated, we prefer to use steam pressure of fifteen pounds, but a greater or lesser pressure can be employed according to the selected time of cooking. Fifteen pounds of steam pressure is approximately two hundred and fifty degrees "Fahrenheit," and at this temperature we prefer to steam the loaves from two hours to two hours and fifty minutes, according to the material used.

The effect of the high temperature employed is to arrest or suspend the diastatic action of the malt or its water extract, or Aspergillus Oryzae, or its extract, before it has had an opportunity to produce maltose. The effect of the use of the malt under these conditions is to facilitate and increase the dextrinization of at least a part of the starch-contents of the product. In place of malt, any other suitable enzym or soluble ferment, such as mold or other diastase may be employed.

*Step 7—Air-drying.*—The loaves are then removed from the retort and allowed to stand in an open room for about twenty-four hours to permit the evaporation of moisture by natural air-drying action. At the end of approximately twenty-four hours, the loaves are found to be comparatively dry. They are not sticky and are very tough.

*Step 8—Pulverizing.*—The loaves are then pulverized, or broken up in a suitable manner. We prefer to feed into a pulverizing machine where they are ground into small particles varying from the size of a pinhead to that of a pea or bean.

*Step 9—Heat-drying.*—The broken particles are dried in any suitable form of heat drier until the granulated product contains approximately ten per cent. of moisture. Cold air drying may be employed if desired.

*Step 10—Sifting.*—The dried and broken particles preferably are sifted to separate the various sizes of particles into uniform groups so that each group can be roasted separately, as set forth in step eleven.

*Step 11—Roasting.*—The pulverized and dried material is roasted, preferably to a dark coffee brown color. This roasting may be effected in an ordinary coffee roaster, and as before stated, the different sizes are preferably roasted separately. Care should be taken to see that the product is not burned or charred, as a disagreeable taste will be thereby imparted to the final product.

*Step 12—Cooling.*—The roasted grains are preferably placed in any suitable form of cooler and cold air blown up through the grains until they are cool.

*Step 13—Percolation.*—The roasted grains are placed in ordinary percolators and boiling water is poured over same until the desired extract is obtained. We find that a good yield can be obtained by running the water successively through four or five percolators. The desired extract may be secured by boiling instead of percolation.

*Step 14—Vacuum-evaporation.*—The liquid extract thus obtained is preferably placed in an ordinary vacuum pan and evaporated down to any desired density. If the evaporated extract is to be dried in a rotary vacuum drier, the density of evaporation in the vacuum should not be greater than from seven to ten degrees B., in order to secure the best results. If vacuum shelf driers and pans are to be used in the final drying, the density of from twenty-two to twenty-seven degrees B., is preferable.

*Step 15—Vacuum-drying.*—After vacuum-evaporating the product to the desired density, the liquid extract preferably is vacuum dried to produce the desired dry extract. Any suitable manner of vacuum drying may be employed. That is to say, we may employ either a rotary vacuum drier or vacuum shelf drier, or any desired and suitable manner of drying. We prefer to employ the shelf drier. The condensed liquid usually requires from two and one-half to three hours to pass into dried extract form in these driers. The action of the vacuum causes thin layers of extract to rise and form bubbles which finally dry in the form of a thick porous cake from two to two and one-half inches thick.

*Step 16—Granulation.*—The porous cake is scraped from the pans and granulated in any suitable manner. Granulation means breaking the product into tiny flakes or scales. It is desirable that the scales or flakes should be as thin as possible so they can dissolve readily when coming in contact with boiling water.

The product of the present invention is produced in the manner described, without using sugar, maltose or other saccharine matter introduced to give flavor thus produced without any necessary additions to the original grains, is readily soluble in hot water and serves in taste, appearance and volume as an agreeable substitute for coffee and other similar beverages.

The delicious flavor of the resulting product is apparently traceable to the wheat and rye, and the mineral matters, mostly phosphates, are derived from the salts found in the grains and in the bran.

The action of the heat, moisture and pressure in dissolving and partially or wholly dextrinizing a certain proportion of the starch-granules of the grains and bran, also is probably instrumental in adding to the agreeable taste and color of the product, as well as increasing the yield.

The soluble carbohydrates formed by the action of heat and moisture on the starting materials are dextrins which by the roasting step are partially transformed into reducing sugars. The dextrins in the final product are easily assimilable in the digestive process. The resulting product contains phosphate of potash which is useful in building bone and nerve cells.

We have thus succeeded in creating from starch-bearing materials, without necessary addition of saccharine or other extraneous matters, a product containing valuable mineral salts and carbohydrates, capable of affording nutrition to growing children and working men, these ingredients being in a concentrated and palatable form, having an agreeable taste and capable of replacing caffein-bearing and other more or less harmful beverages.

In the process hereinbefore described, sufficient wet heat is used to partially dextrinize or render soluble at least a portion of the starch-bearing materials. The dextrinized contents have a tendency to change into reduced sugars during the roasting step. By thus converting or dextrinizing part of the starch-contents of the product the flavor is greatly improved. A number of experiments which we have made indicate that thorough dextrinization or conversion of all of the starch-contents into soluble parts has the tendency to produce a disagreeable or sickening flavor, in the finished product, particularly after the roasting step.

When the process is carried out by dextrinizing the cereals alone, or by facilitating and increasing the dextrinization by the use of malt coupled with the arresting of the diastatic action so as to prevent the formation of maltose, it is found that an agreeable coffee-like flavor is developed in the finished product.

What is claimed as new, is:

1. A beverage product process which consists in partially dextrinizing a mixture of starch-bearing and diastatic material, while arresting the diastatic formation of maltose to about the extent which results from subjecting the mixture in the presence of moisture to a temperature of about 250° F. for about two and one-half hours, in powdering the partially dextrinized material and roasting the powder.

2. A beverage product process which consists in making a dough of moistened starch-bearing material and diastatic material, in heating the dough for about two and one-half hours at a temperature of about 250° F., so as to partially dextrinize the same while arresting the diastatic formation of maltose, in powdering the partially dextrinized dough and roasting the powder.

3. A beverage product, consisting of a roasted powder made from a mixture of starch-bearing material and diastatic material partially dextrinized, while the formation of maltose is arrested to about the extent which results from heating the mixture in the presence of moisture at about 250° F. for about two and one-half hours.

4. A beverage product, consisting of a roasted powder made from a dough of starch-bearing material and diastatic material partially dextrinized, while the formation of maltose is arrested to about the extent which results from heating the dough at about 250° F. for about two and one-half hours.

5. A beverage extract, consisting of the extract of a roasted mixture of starch-bearing material and diastatic material partially dextrinized, while the formation of maltose is arrested to about the extent which results from heating the mixture at about 250° F. for about two and one-half hours.

JOHN L. KELLOGG.
BORIS KAZMANN.